United States Patent [19]

Takahashi

[11] Patent Number: 5,140,660
[45] Date of Patent: Aug. 18, 1992

[54] OPTICAL CONNECTOR FERRULE

[75] Inventor: Mitsuo Takahashi, Matsudo, Japan

[73] Assignee: Seikoh Giken Co., Ltd., Matsudo, Japan

[21] Appl. No.: 481,747

[22] Filed: Feb. 15, 1990

[30] Foreign Application Priority Data

Jan. 12, 1990 [JP] Japan .................................. 2-5850

[51] Int. Cl.$^5$ .............................................. G02B 6/36
[52] U.S. Cl. ........................................ 385/79; 385/78
[58] Field of Search ............... 350/96.2, 96.21, 96.18, 350/96.15; 385/78, 79, 60, 61, 72

[56] References Cited

U.S. PATENT DOCUMENTS

| | | | |
|---|---|---|---|
| 4,285,572 | 8/1981 | Beaudette et al. | 350/96.2 |
| 4,380,365 | 4/1983 | Gross | 350/96.18 |
| 4,383,731 | 5/1983 | Simon et al. | 350/96.18 |
| 4,634,214 | 1/1987 | Cannon, Jr. et al. | 350/96.2 |
| 4,702,556 | 10/1987 | Ishii et al. | 350/96.2 X |
| 4,756,592 | 7/1988 | Sasayama et al. | 350/96.2 |
| 4,812,002 | 3/1989 | Kato et al. | 350/96.18 |
| 4,865,410 | 9/1989 | Estrada et al. | 350/96.2 |
| 4,883,342 | 11/1989 | Ishii et al. | 350/96.2 X |

*Primary Examiner*—John D. Lee
*Assistant Examiner*—John Ngo
*Attorney, Agent, or Firm*—Spencer, Frank & Schneider

[57] ABSTRACT

An optical connector ferrule comprising a ferrule base and a cylindrical tip. The ferrule base has a planar end portion extending transverse to the longitudinal axis of the ferrule, and the cylindrical tip has an outside diameter which is less than the outside dimension of the planar end portion of the ferrule base. A first planar end portion of the cylindrical tip extends in a direction transverse to the longitudinal axis, and a second end portion thereof extends at an oblique angle to the longitudinal axis. The surface of the second end portion has a hemispherical shape. The cylindrical tip receives an optical fiber having an end which has a hemispherical shape, and the hemispherical shaped end of the optical fiber is continuous with the hemispherical surface of the second end portion of the cylindrical tip.

12 Claims, 3 Drawing Sheets

OPTICAL CONNECTOR FERRULE

BACKGROUND OF THE INVENTION

The present invention relates to optical connector ferrules which can be used in optical fiber connectors for use in optical fiber communication circuits. Optical connector ferrules can also be used in optical attenuators of the variable attenuation type which resemble the optical fiber connectors in structure.

For an optical connector ferrule used to connect an optical fiber to another optical fiber, it is well known by the ordinary person skilled in the art that the normal to the circular surface at the edges of the optical fiber and optical connector ferrule which is used to connect the optical fiber to another optical fiber has to be seven degrees or more with respect to the optical axis of the optical fiber so that the optical losses caused by reflection of an optical beam at the interface between the optical fiber edge and the other surface might be minimized because the optical beam reflection makes the optical power losses increase during the optical power transmission.

If the surface at the edges of the optical fiber and optical connector ferrule is hemispheric and at right angles with respect to the optical axis of the optical connector ferrule through which the optical power can pass, it is also well known by the ordinary person skilled in the art that the optical power losses caused by reflection of the optical power at the interface between the optical fiber edge and the other surface will decrease provided that the polished circular surface of the optical connector ferrule is faced to the other surface at right angles.

FIG. 1 shows an example of an optical connector ferrule body used for conventional optical communications.

Tapered connecting section 3 is provided at an edge of a cylindrical ferrule body 1 made of metal and hole 2 is bored through the optical axis of cylindrical ferrule body 1 so that an optical fiber can pass through the cylindrical ferrule body 1.

The tapered connecting section 3 is provided so that a pair of ferrules might smoothly be inserted into an alignment sleeve which aligns the paired ferrules to be inserted from opposite sides of the alignment sleeve, and so that the inner surface of the alignment sleeve might not be cracked during the attachment/detachment of the optical fibers.

Tapered connecting section 3 is approximately 30 degrees inclined to the optical axis of the cylindrical ferrule body 1.

It is well known by the ordinary person skilled in the art that the surfaces at the edges of the ferrule body and optical fiber can be made hemispherical by simultaneously polishing these surfaces. The hemispheric surface at the edges of the ferrule body and optical fiber can be obtained by the inclined hemispheric polishing of the surface on an elastic material disk when the surface is inclined with respect to the elastic material disk because of their circular deflection.

The method of polishing which is well known by the ordinary person skilled in the art is such that a polishing film is arranged on an elastic material disk so that the edges of the ferrule and optical fiber loosely touch the elastic material disk and such that the edges of the ferrule and optical fiber move against the elastic material disk surface as the disk rotates.

FIG. 2 shows a cross sectional view of an example of the edges of the optical fiber and ferrule materials whose surface is made hemispheric by the use of the polishing film.

Polishing film 7 is attached onto the surface of elastic material disk 6 through an adhesive agent. Polishing tool 8, wherein hole 5 inclined to the normal to the elastic material disk by a predetermined angle $\theta$, is provided so that the edge of the optical connector ferrule is set at $\theta$ degrees with respect to elastic material disk 6. When elastic material disk 6 rotates, the edges of the ferrule and optical fiber move around a circle on the elastic material disk 6 while touching polishing film 7 attached on the surface of the elastic material disk 6.

The vertex on the hemispheric surface being polished has to lie on the optical axis of the optical fiber during the polishing to form an inclined hemispheric surface at the edges of the optical fiber and ferrule.

In accordance with the specifications, the offset of the center of the hemispheric surface to the optical axis of the optical fiber should be 0.06 mm or less when the radius of curvature for the hemispheric surface is 10 to 20 mm. In accordance with the above method, the finished surface satisfies the specifications described above although tapered connecting section 3 provided at the edge of the optical connector ferrule mainly determines the offset of the vertex on the hemispheric surface to the optical axis of the optical fiber.

How to solve the above problem will be described hereinafter referring to an example wherein a ferrule body with a tapered connecting section is inclined by an angle $\theta$ during polishing.

FIG. 3 shows an enlarged view of the optical connector ferrule edge being polished in accordance with the above-mentioned polishing method.

In accordance with this polishing method, the optical connector ferrule is finished in such a manner that the outer edge thereof can concentrically be rubbed off, and vertex P on hemispheric surface R becomes the central point of the distance between points A and B.

The quantity of the materials scrubbed from the optical fiber and optical connector ferrule at point B is greater than that scrubbed from the optical fiber and optical connector ferrule at point A, and point P shifts toward point B by a distance S starting from point O on the optical axis of the optical fiber.

Distance S increases as the angle $\theta$ of the inclination increases. The radius of curvature of the hemisphere increases as the quantity of the materials scrubbed for the optical fiber and optical connector ferrule increases because the pressure of the scrubbing decreases in inverse proportion the quantity of materials scrubbed from the optical fiber and optical connector ferrule. Any change in the radius of curvature of the hemisphere is thus not fixed and uncertain.

If an optical connector ferrule having a tapered connecting section at the edge thereof is finished by scrubbing the edge thereof in such a manner that the hemispheric surface at the edge of the optical connector ferrule is at any other than a right angle or inclined with respect to the optical axis of the optical fiber when the edge of the optical connector ferrule has been polished, the conditions of how the polishing is performed depend on how the optical connector ferrule edge has been scrubbed. The performance of connecting a pair of optical fibers together depends on the radius of curvature of the hemispheric surface after the polishing is completed and on the roughness of the hemispheric surface at the edge of the optical connector ferrule.

The quantity of the materials scrubbed from the optical fiber and optical connector ferrule edges in such a manner that the normal to the optical fiber and optical connector ferrule edges is inclined with respect to the optical axis of the optical fiber in the ferrule body by an angle $\theta$ is 10 times or more greater than that scrubbed from the optical fiber and optical connector ferrule edges in such a manner that the optical fiber and optical connector ferrule edges are at a right angle with respect to the optical axis of the optical fiber in the ferrule body. Thus, the finishing of the optical fiber and optical connector ferrule edges when the edges thereof are inclined consumes a much greater time than when the edges thereof are at right angle with respect to the optical axis of the optical fiber. Greater time to finish the optical fiber and ferrule edges degrades the performance thereof because the optical fiber edge sometimes burns due to the abrasion. How to reduce the quantity of the materials scrubbed from the optical fiber and optical connector ferrule is of great importance.

The objective of the invention is to present a different type of optical fiber ferrule which can be used to construct an optical fiber connector for use in optical fiber communication equipment, and to construct an optical attenuator of the variable attenuation type which resembles an optical fiber connector.

SUMMARY OF THE INVENTION

The optical connector ferrule built in accordance with the present invention consists of a ferrule body which is composed of a ferrule base through which a first hole is bored at the center thereof so as to pass an optical fiber therethrough, a cylindrical tip through which a concentric second hole of smaller diameter than the first hole is bored so as to pass the optical fiber therethrough, and tapered connecting means for connecting the base to the cylindrical tip; and an optical fiber with a hemispheric tip which has been polished together with the cylindrical tip and which is fastened to the cylindrical tip.

Said ferrule body can be made of metal.

The cylindrical tip of the ferrule body forms a capillary which is made of ceramics, and which can be inserted into the ferrule body consisting of the base and connecting tapered section.

The cylindrical tip and optical fiber can be scrubbed together by polishing in such a manner that the edges thereof are cut at a right angle with respect to the optical axis of the optical fiber in the ferrule body or at any angle $\theta$ other than a right angle.

The cylindrical tip can be extruded from the tapered connecting section by 0.2 to 2 mm.

DESCRIPTION OF THE PREFERRED EMBODIMENTS

One embodiment of the present invention will be described hereafter with reference to FIGS. 4 and 5 of the drawings.

Figure 1:
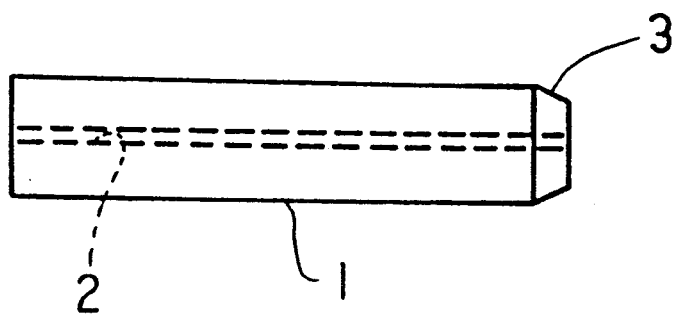
FIG. 1 shows an example of an optical connector ferrule body used for conventional optical communications.
Figure 2:
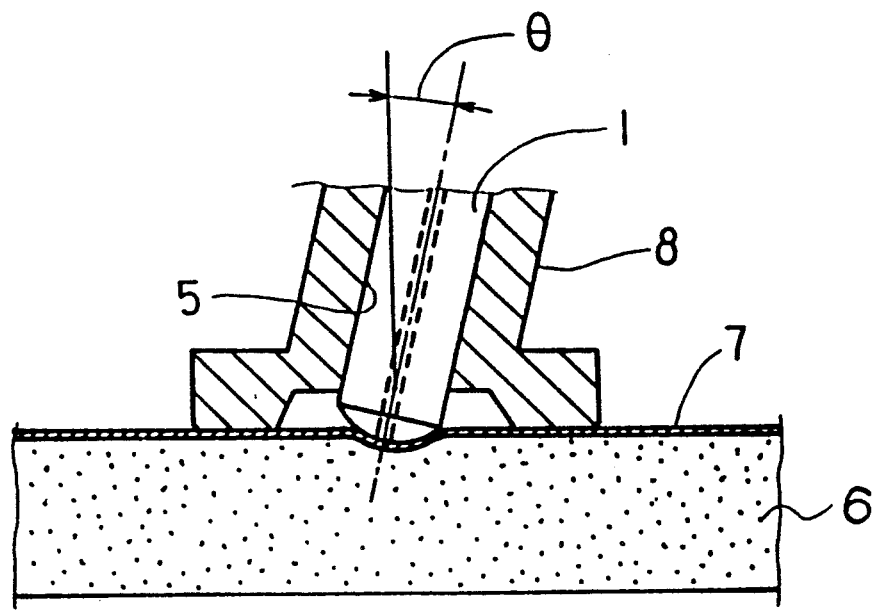
FIG. 2 is a cross sectional view of an example of the edges of the optical fiber and ferrule materials whose surface is made hemispheric by the use of the polishing film.
Figure 3:
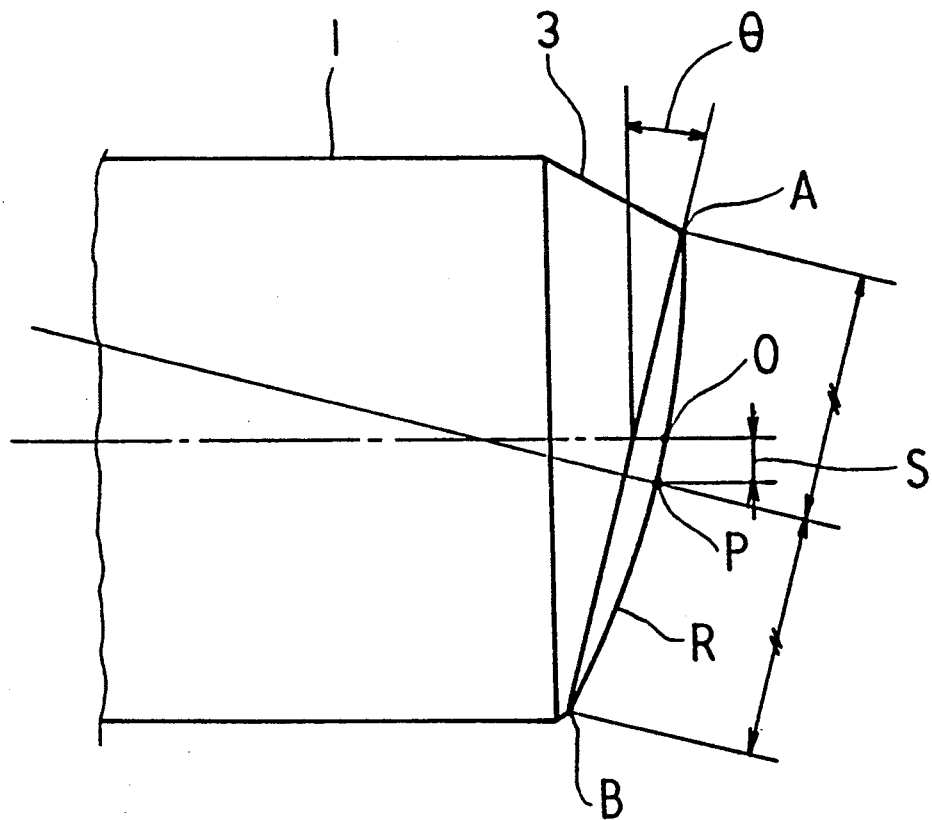
FIG. 3 is an enlarged view of the optical connector ferrule edge being polished in accordance with the abovementioned polishing method.
Figure 4:
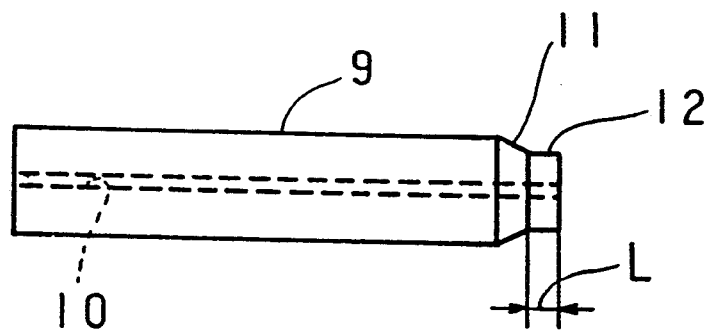
FIG. 4 is a side view of a preferred embodiment of an optical connector ferrule built in accordance with the present invention.
Figure 5:
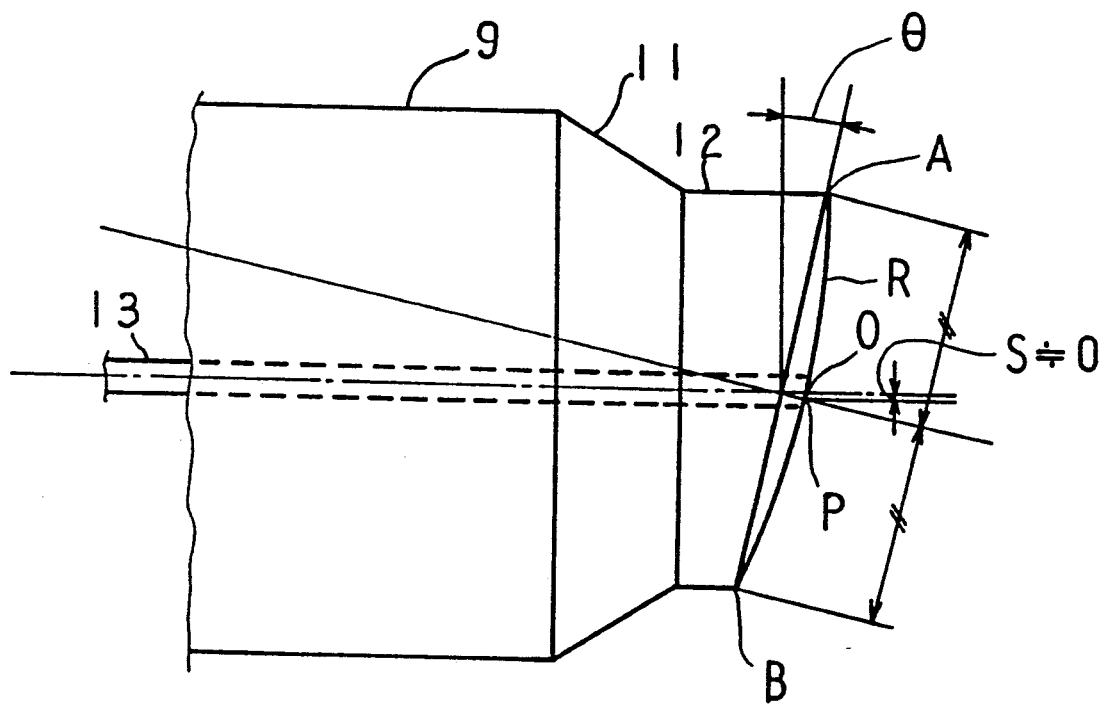
FIG. 5 is a cross-sectional enlarged view of the optical connector ferrule shown in FIG. 4, wherein the edges of the optical fiber and ferrule have been finished in such a manner that the surface at the edges thereof, to which the surface is at any other than a right angle with respect to the optical axis of the optical fiber, has been polished to form a hemispheric surface.

FIGS. 4 and 5 show an optical connector ferrule wherein an optical fiber is installed. Referring to FIG. 5 the edges of the optical fiber and ferrule have been finished in such a manner that the edges thereof to which the surface is at any other than a right angle with respect to the optical axis of the optical fiber in the ferrule body have been polished to form a hemispheric surface.

Base 9 of a ferrule body of the cylindrical type is inserted into an alignment sleeve (not shown) of the optical fiber connector and is supported thereby. Hole 10 to fasten an optical fiber which passes therethrough goes to cylindrical tip 12 through the optical axis of the ferrule body.

Cylindrical tip 12 and ferrule body 9 are connected together through connecting tapered section 11.

Cylindrical tip 12 is much smaller than base 9 of the ferrule body in diameter and it is 0.2 to 2 mm in length for the normal connector. Cylindrical tip 12 is extruded for the tapered connecting section 11.

Cylindrical tip 12 has not been chamfered at the outer edge thereof after the finishing work.

In FIG. 5, the optical ferrule wherein an optical fiber is installed is partly shown in detail and the edges of the optical fiber and ferrule are finished in such a manner that the edges thereof to which the surface is at any other than right angle with respect to the optical axis of the ferrule body are finished to form a hemispheric surface.

Optical fiber 13 is installed in a ferrule body built in accordance with the present invention and the edges of the optical fiber and ferrule are scrubbed to form a hemisphere in such a manner that the edge surface of the optical fiber and ferrule are other than a right angle with respect to the optical axis of the optical fiber in the ferrule body.

The outer edges of the optical fiber and ferrule are concentrically scrubbed if a polishing film attached to an elastic material disk through an adhesive agent is forcibly pressed to the optical fiber and ferrule, whose surfaces at the center thereof are set at any other than a right angle with respect to the normal to the surface of the polishing film attached to the elastic material, while the disk rotates around axis of revolution (not shown).

The length of cylindrical tip 12 is to be specified as that in which only cylindrical tip 12 can be polished while tapered connecting section 11 used to connect cylindrical tip 12 to base 9 is kept unpolished.

In the manner described above, any a relatively large offset of the optical axis cannot occur in the optical connector ferrule since the tapered connecting section 11 has an optical axis which is in line with the optical axis of the ferrule base, and the vertex P of hemisphere R, whose axis is inclined by angle $\theta$, is close to the optical axis 0 after the polishing is completed.

If the cylinder diameter of base 9 is 1.5 mm, the radius of curvature R on the surface at the ferrule edge is 20 mm, and if the angle $\theta$ of the inclination of the optical axis 0 is 10 degrees, the offsets of the optical axis on the surface at the ferrule edge to the optical axis of base 9 is approximately 2.43 $\mu$m which can be disregarded since the allowance is specified as 60 $\mu$m.

The quantity of the material scrubbed from the optical fiber installed in the ferrule built in accordance with the present invention is 40% compared with that installed in the optical connector ferrule having a base cylinder diameter of 2.5 mm, a tapered connecting section length of 0.5 mm and having an inclined optical axis angle of 30 degrees. The time to finish the polished surface in this sample is 30% compared with the conventional sample described above.

Figure 6:
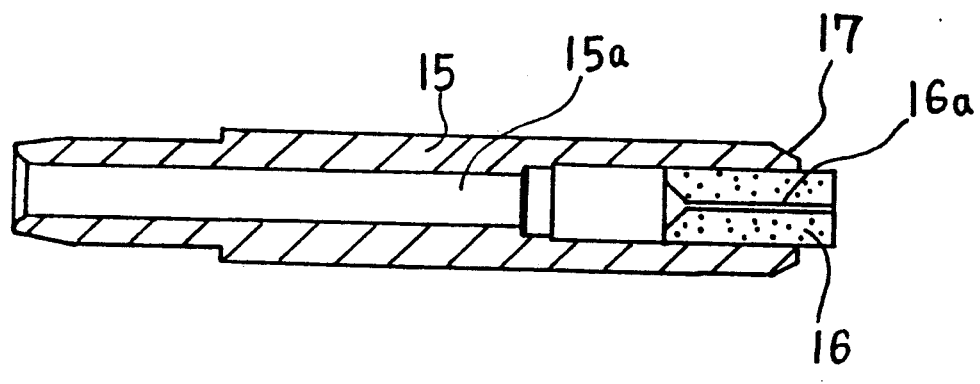
FIG. 6 is a cross-sectional view of another embodiment of the optical connector ferrule built in accordance with the present invention.

Referring to the embodiment shown FIG. 6, a metal ferrule body 15, which is made of stainless steel and has a diameter of approximately 2.5 mm, has a tapered connecting section 17 as shown at the right of the drawing. Hole 15a is bored through metal ferrule body 15 so that both an optical fiber and a cylindrical tip can be inserted into the ferrule body.

Capillary 16 which constitutes a cylindrical tip is made of a ceramic material and hole 16a is bored through capillary 16 so that an optical fiber can pass through the optical axis of capillary 16 on the optical axis thereof. Capillary 16 is extruded by 0.65 mm from the ferrule body.

An optical fiber is inserted into the hole 16a of capillary 16 from the ferrule body at the left thereof, and fastened to capillary 16 in the same manner as described above.

As described heretofore, the offset of the vertex on the surface of the ferrule edge, wherein an optical fiber is installed, to the optical axis of the optical fiber could be minimized by the use of the optical connector ferrule built in accordance with the present invention, and the performance of the connection established by the optical connector ferrule could be improved.

Furthermore, the cost of polishing the edges of the optical fiber and ferrule can be reduced because the quantity of the materials scrubbed from the edges thereof has been reduced. An optical fiber can easily be inserted into the alignment sleeve passing through the tapered connecting section, and the insertion is easier than for the conventional case.

The materials of the optical connector ferrule can be scrubbed off in such a manner that the edges of the optical fiber and optical connector ferrule is at either a right angle or any other than a right angle with respect to the optical axis of the optical fiber in the ferrule body, and this wide selection of the angle of the inclination eliminates unwanted results which can be encountered in the fabrication of the convention optical connector ferrule, i.e., an increase in the variations of the radius of curvature on the edge surface of the optical fiber and ferrule due to an increase in the quantity of the materials scrubbed from the edges of the optical fiber and ferrule, and a decrease in the pressure of contacting the edges of the optical fiber and ferrule to the polishing film.

What is claimed is:

1. An optical connector ferrule having a longitudinal axis, comprising:
    a ferrule base having a planar end portion extending transverse to said longitudinal axis;
    a cylindrical tip having an outside diameter which is less than the outside dimension of the planar end portion of said ferrule base, a first planar end portion of said cylindrical tip extending in a direction transverse to said longitudinal axis, and a second end portion of said cylindrical tip extending at an oblique angle to said longitudinal axis, the surface of said second end portion having a hemispherical shape; and
    a connecting section interposed between the end portion of said ferrule base and the first end portion of said cylindrical tip, a hole extending along said longitudinal axis through said elongated ferrule base, said connecting section and said cylindrical tip receiving therein an optical fiber having an end which has a hemispherical shape, the hemispherical shaped end of said optical fiber being continuous with the hemispherical surface of the second end portion of said cylindrical tip.

2. An optical connector ferrule as defined by claim 1 wherein said connecting section is tapered, said connecting section having a gradually decreasing diameter from the end portion of said ferrule base to the first end portion of said cylindrical tip.

3. An optical connector ferrule as defined by claim 2 wherein said connecting section is tapered, said connecting section having a gradually decreasing diameter from the one end of said ferrule base to said cylindrical tip.

4. An optical connector ferrule as defined by claim 1 wherein the diameter of the hole in said cylindrical tip is less than that of the hole in said ferrule base.

5. An optical connector ferrule as defined by claim 1 wherein the diameters of the holes in said ferrule base, said tapered connection section and said cylindrical tip are the same.

6. An optical connector ferrule as defined by claim 1 wherein said ferrule base is made of metal.

7. An optical connector ferrule as defined by claim 6 wherein said cylindrical tip is a capillary made of ceramic material.

8. An optical connector ferrule as defined by claim 6 wherein said cylindrical tip projects from said tapered connecting section by a distance of 0.2 to 2 mm.

9. An optical connector ferrule having a longitudinal axis, comprising:
    an elongated ferrule base having a connecting section at one end thereof and a hole extending therethrough along said longitudinal axis; and
    a cylindrical tip inserted within said hole and projecting from the connecting section of said ferrule base, the projecting end of said cylindrical tip extending at an oblique angle to said longitudinal axis and having a hemispherical shape, said cylindrical tip having a hole therein coincident with said longitudinal axis for receiving an optical fiber having an end which has a hemispherical shape, the hemispherical shaped end of said optical fiber being continuous with the hemispherical surface of said cylindrical tip.

10. An optical connector ferrule having a longitudinal axis, comprising:

a ferrule base having a planar end portion extending transverse to said longitudinal axis;

a cylindrical tip having an outside diameter which is less than the outside dimension of the planar end portion of said ferrule base, first and second end portions of said cylindrical tip extending in a direction transverse to said longitudinal axis, the surface of said second end portion having a hemispherical shape; and a connecting section interposed between the end portion of said ferrule base and the first end portion of said tip, a hole extending along said longitudinal axis through said elongated ferrule base, said connecting section and said cylindrical tip receiving therein an optical fiber having an end which has a hemispherical shape, the hemispherical shaped end of said optical fiber being continuous with the hemispherical surface of the second end portion of said cylindrical tip.

11. An optical connector ferrule as defined by claim 10 wherein said connecting section is tapered, said connecting section having a gradually decreasing diameter from the end portion of said ferrule base to the first end portion of said cylindrical tip.

12. An optical connector ferrule having a longitudinal axis, comprising:

a ferrule base having a planar end portion extending transverse to said longitudinal axis; and a cylindrical tip having an outside diameter which is less than the outside dimension of the planar end portion of said ferrule base, a first planar end portion of said cylindrical tip extending in a direction transverse to said longitudinal axis, and a second end portion of said cylindrical tip extending at an oblique angle to said longitudinal axis, the surface of said second end portion having a hemispherical shape, said cylindrical tip receiving therein an optical fiber having an end which has a hemispherical shape, the hemispherical shaped end of said optical fiber being continuous with the hemispherical surface of the second end portion of said cylindrical tip.

* * * * *